United States Patent
Nagata et al.

(10) Patent No.: US 9,416,257 B2
(45) Date of Patent: *Aug. 16, 2016

(54) ANTIVIBRATION RUBBER COMPOSITION, AND ANTIVIBRATION RUBBER

(71) Applicant: BRIDGESTONE CORPORATION, Tokyo (JP)

(72) Inventors: Takeshi Nagata, Yokohama (JP); Masaaki Yamamoto, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/441,006

(22) PCT Filed: Nov. 12, 2013

(86) PCT No.: PCT/JP2013/080483
§ 371 (c)(1),
(2) Date: May 6, 2015

(87) PCT Pub. No.: WO2014/080794
PCT Pub. Date: May 30, 2014

(65) Prior Publication Data
US 2015/0299434 A1    Oct. 22, 2015

(30) Foreign Application Priority Data
Nov. 22, 2012  (JP) .................................. 2012-256449

(51) Int. Cl.
*C08L 7/00*    (2006.01)
*C09K 3/00*    (2006.01)

(52) U.S. Cl.
CPC .... *C08L 7/00* (2013.01); *C09K 3/00* (2013.01)

(58) Field of Classification Search
CPC .............. C08L 7/00; C08L 9/00; C08K 3/00; C08K 5/3415; C08K 5/433
See application file for complete search history.

(56) References Cited

U.S. PATENT DOCUMENTS

| 3,703,500 A | 11/1972 | Nast et al. |
| 2014/0080979 A1 | 3/2014 | Yamamoto |
| 2015/0031809 A1* | 1/2015 | Yamamoto .................... 524/169 |
| 2015/0136298 A1* | 5/2015 | Huyghe et al. ................ 152/537 |

FOREIGN PATENT DOCUMENTS

| CA | 2010905 A1 | 8/1990 |
| CN | 103562294 A | 2/2014 |
| EP | 2 196 496 A2 | 6/2010 |
| JP | 50-4374 B1 | 2/1975 |
| JP | 01-230566 A | 9/1989 |
| JP | 02-248442 A | 10/1990 |
| JP | 03-258840 A | 11/1991 |
| JP | 2005-105154 A | 4/2005 |
| JP | 2006-131871 A | 5/2006 |
| JP | 2012-229323 A | 11/2012 |
| JP | 2013-155298 A | 8/2013 |
| JP | 2013-155300 A | 8/2013 |
| WO | 2012/165561 A1 | 12/2012 |
| WO | 2013/114877 A1 | 8/2013 |

OTHER PUBLICATIONS

International Search Report of PCT/JP2013/080483 filed Feb. 25, 2014.
Communication dated Nov. 24, 2015 from the Intellectual Property Office of P.R. China issued in corresponding Application No. 201380061206.9.

* cited by examiner

*Primary Examiner* — Nathan M Nutter
(74) *Attorney, Agent, or Firm* — Sughrue Mion, PLLC

(57) ABSTRACT

The present invention addresses the problem of providing: an antivibration rubber composition which can provide a hardened rubber product that has excellent antivibration properties (a low motion magnification), compression permanent strain and low-temperature properties and can keep strength properties (hardness, tensile elongation, tensile strength) and hot aging resistance thereof at good levels; and an antivibration rubber which is produced by hardening the rubber composition. An antivibration rubber composition characterized by comprising a rubber component, sulfur, a bismaleimide compound and N-phenyl-N-(trichloro-methylthio)benzenesulfoneamide, wherein the rubber component comprises a natural rubber and a polybutadiene rubber at a blend ratio of 60/40 to 90/10 by mass.

5 Claims, No Drawings

ANTIVIBRATION RUBBER COMPOSITION, AND ANTIVIBRATION RUBBER

CROSS REFERENCE TO RELATED APPLICATIONS

This is a National Stage of International Application No. PCT/JP2013/080483 filed Nov. 12, 2013, claiming priority based on Japanese Patent Application No. 2012-256449 filed Nov. 22, 2012, the contents of all of which are incorporated herein by reference in their entirety.

TECHNICAL FIELD

This invention relates in particular to an anti-vibration rubber composition and an anti-vibration rubber which can be advantageously used in parts of an automobile that are exposed to elevated temperatures, such as torsional dampers, engine mounts and muffler hangers.

BACKGROUND ART

The basic properties required of anti-vibration rubbers are strength properties for supporting a heavy body such as an engine, and an anti-vibration performance which absorbs and suppresses vibrations by the supported body. Moreover, when used in a high-temperature environment such as an engine compartment, the anti-vibration rubber, in addition to having, of course, excellent strength properties, a low dynamic-to-static modulus ratio and an excellent anti-vibration performance, is also required to have an excellent heat aging resistance. In addition to the above, because automobiles are used even in high-latitude regions, automotive anti-vibration rubbers are also required to have good low-temperature properties.

Research on compounding given amounts of a rubber component, a crosslinking system and other additives for anti-vibration rubber in order to impart such collectively outstanding properties is actively underway, and numerous patent applications have already been filed. Of these many patent applications, some make deliberate use of bismaleimide compounds to improve the crosslinking system. For example, JP-A 3-258840 discloses rubber compounding art that provides excellent properties, including heat aging resistance and dynamic-to-static modulus ratio, by compounding sulfur, bismaleimide and a specific carbon black with a rubber component.

However, although such rubber compositions do have excellent properties, including heat aging resistance, the dynamic-to-static modulus ratio, compressive set and low-temperature properties do not achieve the desired levels, and so there has existed a need for further improvement.

PRIOR-ART DOCUMENT

Patent Document

Patent Document 1: JP-A H03-258840

SUMMARY OF THE INVENTION

Problems to be Solved by the Invention

It is therefore an object of the invention to provide an anti-vibration rubber composition from which there can be obtained cured rubber products endowed with excellent rubber characteristics such as anti-vibration characteristics (low dynamic-to-static modulus ratio), compression set and low-temperature properties, and also an ability to maintain good strength properties (hardness, tensile elongation, tensile strength) and a good heat aging resistance. A further object of the invention is to provide an anti-vibration rubber obtained by curing such a rubber composition.

Means for Solving the Problems

The inventor has conducted extensive investigations in order to achieve the above objects, discovering as a result that, in an anti-vibration rubber composition obtained by including, for example, a vulcanizing agent in a rubber component containing natural rubber and polybutadiene rubber, by adjusting the compounding ratio of natural rubber to polybutadiene rubber within the range of 60:40 to 90:10 and by including sulfur, a bismaleimide compound and N-phenyl-N-(trichloromethylthio)benzenesulfonamide in the rubber component, owing to the effects of using these ingredients together, it is possible to obtain excellent anti-vibration characteristics (low dynamic-to-static modulus ratio), compression set and low-temperature properties, and also to maintain good strength characteristics (hardness, tensile elongation, tensile strength) and good heat aging resistance.

Accordingly, this invention provides the following anti-vibration rubber composition and anti-vibration rubber (member).

[1] An anti-vibration rubber composition characterized by including a rubber component containing natural rubber and polybutadiene rubber in a compounding ratio by weight therebetween of from 60/40 to 90/10, sulfur, a bismaleimide compound and N-phenyl-N-(trichloromethylthio)benzenesulfonamide.

[2] The anti-vibration rubber composition according to [1], wherein the bismaleimide compound is included in an amount of from 1.0 to 5.0 parts by weight per 100 parts by weight of the rubber component.

[3] The anti-vibration rubber composition according to [1] or [2], wherein the N-phenyl-N-(trichloromethylthio)benzenesulfonamide is included in an amount of from 0.2 to 4.0 parts by weight per 100 parts by weight of the rubber component.

[4] The anti-vibration rubber composition according to [1], [2] or [3], wherein the sulfur is included in an amount of from 0.4 to 1.0 part by weight per 100 parts by weight of the rubber component.

[5] An anti-vibration rubber obtained by curing the anti-vibration rubber composition of any one of [1] to [4].

Advantageous Effects of the Invention

The anti-vibration rubber composition of the invention is able to maintain good tensile properties (elongation, strength) and a good thermal aging resistance, and is also capable of improving the anti-vibration characteristics (low dynamic-to-static modulus ratio), compression set and low-temperature properties.

EMBODIMENT FOR CARRYING OUT THE INVENTION

In the rubber component of the anti-vibration rubber composition of the invention, a natural rubber (NR) and a polybutadiene rubber (BR) are used together as the primary ingredients. The compounding proportions by weight of the natural rubber (NR) to the polybutadiene rubber (BR) are in the range of 60:40 to 90:10. If the proportion of BR is smaller than the above range, the anti-vibration characteristics (dynamic-to-static modulus ratio) are poor and the degree of improvement in the low-temperature properties is small. On the other hand, if the proportion of BR is too high, basic properties such as the tensile strength (Tb) are diminished.

The natural rubber used here, although not particularly limited, may be suitably selected from among known natural rubbers. Illustrative examples include ribbed smoked sheets (RSS) and technically specified rubber (TSR).

The polybutadiene rubber (BR) used here, although not particularly limited, may be suitably selected from among known polybutadiene rubbers, although a high-cis polybutadiene rubber having a cis-1,4-bond content of at least 95% is preferred. Illustrative examples include "BR01" from JSR Corporation and "150L" from Ube Industries, Ltd.

Although a rubber component containing the above natural rubber (NR) and the above polybutadiene rubber (BR) is used in this invention, in addition to these rubbers, other rubbers such as known synthetic rubbers may also be optionally used, within a range that does not depart from the objects of the invention. Illustrative examples include synthetic rubbers such as isoprene rubber (IR), styrene-butadiene rubber (SBR), acrylonitrile-butadiene rubber (NBR), chloroprene rubber (CR), isobutylene-isoprene rubber, silicone rubber (Q), acrylic rubber (ACM), ethylene-propylene rubber (EPDM) and acrylate-butadiene rubber, as well as molecular chain end group-modified versions of these synthetic rubbers. One, two or more such additional rubbers may be suitably selected and used.

The rubber mixture of natural rubber (NR) and polybutadiene rubber (BR) accounts for a proportion of the overall rubber which, to successfully manifest the advantageous effects of the invention, is preferably at least 60 wt %, more preferably at least 70 wt %, and even more preferably at least 80 wt %.

In the practice of the invention, a bismaleimide compound is used as one of the vulcanizing agents. The bismaleimide compound may be a known bismaleimide compound, and is not particularly limited. However, in this invention, preferred use may be made of a bismaleimide of the following structural formula.

[Chemical Formula 1]

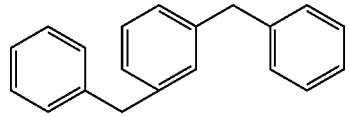

In this formula, x and y are each independently any integer from 0 to 20, and more preferably an integer from 0 to 10. $R^2$ is an aromatic group of 5 to 18 carbons or an alkyl group-containing aromatic group of 7 to 24 carbons. Specific examples include aromatic groups of the structures shown below. Two bond symbols are not shown in the following structures, although divalent groups are formed by two bonds from any two carbon atoms selected within the following structures.

[Chemical Formula 2]

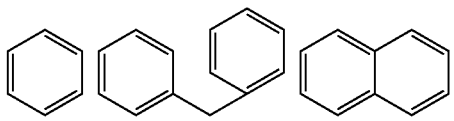

-continued

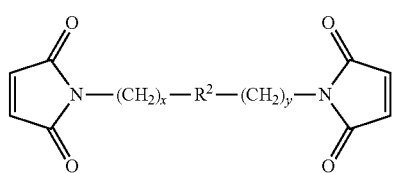

Illustrative examples of bismaleimide compounds of the above structural formulas include N,N'-o-phenylenebismaleimide, N,N'-m-phenylenebismaleimide, N,N'-p-phenylenebismaleimide, N,N'-(4,4'-diphenylmethane)bismaleimide, 2,2-bis-[4-(4-maleimidophenoxy)phenyl]propane and bis(3-ethyl-5-methyl-4-maleimidophenyl)methane.

In this invention, preferred use may be made of N,N'-m-phenylenebismaleimide and N,N'-(4,4'-diphenylmethane)bismaleimide.

The above bismaleimide compound may be of one type used alone or may be of two or more types used in combination. The amount included is preferably set to from 1.0 to 5.0 parts by weight per 100 parts by weight of the diene rubber. At a bismaleimide compound content below 1.0 part by weight, the low-temperature properties, compression set and the like may worsen. On the other hand, at more than 5.0 parts by weight, the tensile properties (elongation, strength) and other properties may worsen.

The rubber composition of the invention includes N-phenyl-N-(trichloromethylthio)benzenesulfonamide. N-phenyl-N-(trichloromethylthio)benzenesulfonamide has the chemical structure shown below. In this invention, by including the above substance, it is possible to obtain an anti-vibration rubber which excels in terms of all of the following: heat aging resistance, compression set, dynamic-to-static modulus ratio and low-temperature properties. Such improvements were not possible merely by adjusting the relative proportions of sulfur and vulcanization accelerator or the type of vulcanization accelerator as has been done in the prior art.

[Chemical Formula 3]

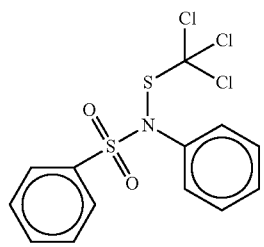

The content of N-phenyl-N-(trichloromethylthio)benzenesulfonamide per 100 parts by weight of the rubber component is preferably from 0.2 to 4 parts by weight. Outside of this range, improvements in tensile properties (elongation, strength), dynamic-to-static modulus ratio and low-temperature characteristics may not be observable.

An example of a specific trade name for N-phenyl-N-(trichloromethylthio)benzenesulfonamide is Vulkalent E/C (from Lanxess AG).

A vulcanization accelerator may be used in the rubber composition of the invention. The vulcanization accelerator is exemplified by, but not particularly limited to, benzothiazole-type vulcanization accelerators such as 2-mercaptobenzothiazole, dibenzothiazyl disulfide, N-cyclohexyl-2-benzothiazyl sulfenamide, N-t-butyl-2-benzothiazyl sulfenamide and N-t-butyl-2-benzothiazyl sulfenamide; guanidine-type vulcanization accelerators such as diphenylguanidine; thiuram-type vulcanization accelerators such as tetramethylthiuram disulfide, tetraethylthiuram disulfide, tetrabutylthiuram disulfide, tetradodecylthiuram disulfide, tetraoctylthiuram disulfide, tetrabenzylthiuram disulfide and dipentamethylenethiuram tetrasulfide; dithiocarbamic acid salts such as zinc dimethyldithiocarbamate; and zinc dialkyldithiophosphate.

The above vulcanization accelerators may be of one type, such as a sulfenamide type, a thiuram type, a thiazole type, a guanidine type or a dithiocarbamic acid salt type, or may be a combination of two or more such types. In order to, for example, adjust the vulcanization behavior (rate), it is preferable to use a combination of a thiuram-type and/or a thiazole-type vulcanization accelerator having a relatively high vulcanization accelerating ability with a guanidine-type and/or a sulfenamide-type vulcanization accelerator having a relatively moderate to low vulcanization accelerating ability. Specific examples include the combination of tetramethylthiuram disulfide with N-cyclohexyl-2-benzothiazyl sulfenamide, the combination of tetrabutylthiuram disulfide with N-t-butyl-2-benzothiazyl sulfenamide, and the combination of dibenzothiazyl disulfide with diphenylguanidine. The combination of vulcanization accelerators is not limited to the above combinations. The total amount of vulcanization accelerator included per 100 parts by weight of the rubber component is preferably from 0.2 to 10 parts by weight.

In addition, the rubber composition of the invention also includes sulfur as an essential ingredient. By doing so, the rubber properties can be even further improved and, in particular, low-temperature property and dynamic-to-static modulus ratio improving effects can be obtained. The sulfur content is preferably from 0.4 to 1.0 part by weight per 100 parts by weight of the rubber component. Outside of this range, at least one from among the heat aging resistance, the compression set, the dynamic-to-static modulus ratio and the low-temperature properties may worsen, as a result of which the desired actions and effects of the invention may not be achieved.

In this invention, a vulcanization co-accelerator such as zinc white (ZnO) or a fatty acid may be included to help promote vulcanization. The fatty acid may be a straight-chain or branched fatty acid that is saturated or unsaturated. The number of carbons on the fatty acid is not particularly limited, although a fatty acid of from 1 to 30 carbons, and preferably from 15 to 30 carbons, is advantageous. Specific examples include naphthenic acids such as cyclohexanoic acid (cyclohexanecarboxylic acid) and alkylcyclopentanes having side chains; saturated fatty acids such as hexanoic acid, octanoic acid, decanoic acid (including branched carboxylic acids such as neodecanoic acid), dodecanoic acid, tetradecanoic acid, hexadecanoic acid and octadecanoic acid (stearic acid); unsaturated fatty acids such as methacrylic acid, oleic acid, linoleic acid and linolenic acid; and resin acids such as rosin, tall oil acids and abietic acid. These may be used singly, or two or more may be used in combination. In this invention, preferred use can be made of zinc white and stearic acid. The content of these co-accelerators per 100 parts by weight of the rubber component is preferably from 1 to 10 parts by weight, and more preferably from 2 to 7 parts by weight. A content greater than 10 parts by weight may lead to a poor workability and a poor dynamic-to-static modulus ratio, whereas a content of less than 1 part by weight may retard vulcanization.

A known oil may be used. Examples include, without particular limitation, process oils such as aromatic oils, naphthenic oils and paraffinic oils; vegetable oils such as coconut oil; synthetic oils such as alkylbenzene oils; and castor oil. In this invention, the use of naphthenic oils is preferred. These may be used singly or two or more may be used in combination. The content of these oils per 100 parts by weight of the rubber component, although not particularly limited, may be set to generally from 2 to 80 parts by weight. At a content outside of the above range, the kneading workability may worsen. When oil-extended rubber is used in the rubber component, the oil included in the rubber should be adjusted such that the combined amount of such oil and any oils that are separately added during mixing falls within the above range.

The type (grade) of carbon black is not particularly limited. Examples include carbon blacks such as SRF, GPF, FEF, HAF, ISAF, SAF, FT and MT. In this invention, preferred use may be made of FEF, GPF, SRF, MT and FT. These carbon blacks may be used singly or two or more may be used in combination.

The average particle diameter of carbon black is not particularly limited. Also, the carbon black has an iodine absorption of preferably from 10 to 70 mg/g.

The DBP oil absorption is one indicator of the structure (the collective form of primary particles) of carbon black. The DBP oil absorption of the carbon black used in this invention is preferably from 30 to 180 mL/100 g.

The carbon black content, although not particularly limited, is preferably from 20 to 80 parts by weight per 100 parts by weight of the rubber component.

A known antioxidant may be used. Examples include, without particular limitation, phenolic antioxidants, imidazole-type antioxidants and amine-type antioxidants. The content of these antioxidants per 100 parts by weight of the rubber component is generally from 1.5 to 10 parts by weight, and preferably from 1.5 to 7 parts by weight. A single antioxidant may be used alone or two or more antioxidants may be used in combination.

Where necessary, additives commonly used in the rubber industry, such as waxes, antioxidants, fillers, blowing agents, plasticizers, oils, lubricants, tackifiers, petroleum-based resins, ultraviolet absorbers, dispersants, compatibilizing agents, homogenizing agents and vulcanization retardants, may be suitably included in the rubber component, provided the use of these additives does not detract from the advantageous effects of the invention.

The method used to compound the various above ingredients when preparing the rubber composition of the invention is not particularly limited. Kneading may be carried out by compounding all the ingredient starting materials at once, or kneading may be carried out by compounding the respective ingredients in two or three separate stages. Kneading may be carried out using a mixer such as roll mill, an internal mixer or a Banbury rotor. In addition, a known apparatus such as an extruder or a press may be used when forming the rubber composition into a sheet, strip or the like.

The vulcanization conditions when curing the above rubber composition are not particularly limited, although use can generally be made of a vulcanization temperature of from 140 to 180° C. and a vulcanization time of from 5 to 120 minutes.

The anti-vibration rubber of the invention is obtained by vulcanizing the above-described rubber composition. This anti-vibration rubber (member) is preferably used in those parts of an automobile which are exposed to elevated temperatures, such as torsional dampers, engine mounts or muffler hangers, but is not limited to such uses.

EXAMPLES

The invention is illustrated more fully below by way of Working Examples and Comparative Examples, although the invention is not limited by these Examples.

Working Examples 1 to 15, Comparative Examples 1 to 5

The compounding formulations shown in Table 1 below were kneaded and vulcanized, and the anti-vibration rubber compositions of Working Examples 1 to 15 and Comparative Examples 1 to 5 were each vulcanized and cured under given conditions, thereby producing sheets having a length of 120 mm, a width of 120 mm and a thickness of 2 mm. These sheets were used as specimens for evaluating the anti-vibration rubbers of the invention. The resulting rubber sheets were evaluated by carrying out measurements of the hardness (Hd), tensile elongation (Eb), tensile strength (Tb), heat aging resistance, compressive set (CS), dynamic-to-static modulus ratio (Kd/Ks) and low-temperature properties in accordance with the following JIS standards. The results are presented in Table 1 (Working Examples of invention) and Table 2 (Comparative Examples).

[Hardness (Hd)]
Carried out in accordance with JIS K 6253 (type A).

[Tensile Elongation (Eb)]
Carried out in accordance with JIS K 6251. A higher value indicates a better tensile elongation (Eb).

[Tensile Strength (Tb)]
Carried out in accordance with JIS K 6251. A higher value indicates a better tensile strength (Tb).

[Heat Aging Resistance (Heat Aging Test)]
This test was carried out under heat aging conditions of 100° C. and 500 hours in accordance with JIS K 6257. The respective test specimens were left to stand under these conditions, following which the hardness after heat aging (Hd), the tensile strength after heat aging (Eb) and the tensile strength after heat aging (Tb) were each measured. The percent retention of each of these values was determined.

[Compression Set]
A compression set test was carried out in accordance with JIS K 6262 under heating and temperature conditions of 100° C. and 72 hours.

[Dynamic Spring Constant (Kd) and Dynamic-to-Static Modulus Ratio (Kd/Ks)]
A cylindrical rubber sample having a diameter of 30 mm and a height of 30 mm was fabricated and the Kd was measured at 100 Hz in accordance with JIS K 6385. A lower dynamic-to-static modulus ratio (Kd/Ks) indicates better dynamic characteristics.

[Low-Temperature Properties]
A cylindrical rubber sample having a diameter of 30 mm and a height of 30 mm was fabricated, and the Kd value was measured at 43 Hz (this is treated as the initial Kd value) in accordance with JIS K 6385. Next, after 10 days of exposure at −35° C. in a constant-temperature tank, the sample was removed from the tank and the Kd value was similarly measured under the above conditions (this was treated as the Kd value after low-temperature exposure). The ratio (Kd after low-temperature exposure)/(initial Kd) was used as the criterion for rating the low-temperature properties. A smaller change in Kd after low-temperature exposure indicates good low-temperature properties. In the tables, the low-temperature properties were rated as "Good" when (Kd after low-temperature exposure)/(initial Kd) 5, and were rated as "NG" when (Kd after low-temperature exposure)/(initial Kd)>5.

Details on the compounding described above are given below.

Rubber Component
  Natural rubber (NR): RSS#4
  "BR UBEPOL 150L": The polybutadiene rubber "150L" from Ube Industries, Ltd.
  "BR JSR BR01": The polybutadiene rubber "BR01" from JSR Corporation
  "SBR JSR SBR1500": The styrene-butadiene rubber "SBR 1500" from JSR Corporation Carbon Black
  FT carbon black was used: "Asahi Thermal" from Asahi Carbon Co., Ltd.
  FEF carbon black was used: "Asahi #65" from Asahi Carbon Co., Ltd.

Stearic Acid
  "Stearic Acid 50S" from New Japan Chemical Co., Ltd.

Zinc White
  Available as "No. 3 Zinc White" (Hakusui Tech Co., Ltd.)

Microcrystalline Wax
  Available as "Suntight S" from Seiko Chemical Co., Ltd.

Antioxidant: RD
  2,2,4-trimethyl-1,2-dihydroquinoline polymer, available as "Nocrac 224" from Ouchi Shinko Chemical Industry Co., Ltd.

Antioxidant: 6C
  N-phenyl-N'-(1,3-dimethylbutyl)-p-phenylenediamine, available as "Nocrac NS-6" from Ouchi Shinko Chemical Industry Co., Ltd.

Naphthenic Oil
  "Sunthene 4240" from Sun Refining and Marketing Company

Sulfur
  Available as "Sulfur Powder" from Tsurumi Chemical

N,N'-m-phenylenebismaleimide
  Available as "Vulnoc PM" from Ouchi Shinko Chemical Industry Co., Ltd.

N,N'-(4,4'-diphenylmethane)bismaleimide
  Available as "BMI-RB" from Daiwa Kasei Industry Co., Ltd.

Sulfenamide-Type Vulcanization Accelerator: CZ
  Available under the trade name "Nocceler CZ-G" (Ouchi Shinko Chemical Industry Co., Ltd.)

N-phenyl-N-(trichloromethylthio)benzenesulfonamide
  Available under the trade name "Vulkalent E/C" (Lanxess AG)

TABLE 1

| Rubber formulation | Example | | | | | | | |
|---|---|---|---|---|---|---|---|---|
| (pbw) | 1 | 2 | 3 | 4 | 5 | 6 | 7 | 8 |
| NR | 80.0 | 80.0 | 90.0 | 60.0 | 70.0 | 80.0 | 80.0 | 80.0 |
| BR (UBEPOL 150L) | 20.0 | | 10.0 | 40.0 | 30.0 | 20.0 | 20.0 | 20.0 |
| BR (BR01) | | 20.0 | | | | | | |
| SBR (SBR 1500) | | | | | | | | |
| FT CB | 30.0 | 30.0 | 30.0 | 30.0 | 30.0 | 30.0 | 30.0 | 30.0 |
| FET CB | | | | | | | | |
| Stearic acid | 1.0 | 1.0 | 1.0 | 1.0 | 1.0 | 1.0 | 1.0 | 1.0 |
| Zinc white | 3.0 | 3.0 | 3.0 | 3.0 | 3.0 | 3.0 | 3.0 | 3.0 |

TABLE 1-continued

|  | | | | | | | | |
|---|---|---|---|---|---|---|---|---|
| WAX | 2.0 | 2.0 | 2.0 | 2.0 | 2.0 | 2.0 | 2.0 | 2.0 |
| Antioxidant RD | 1.0 | 1.0 | 1.0 | 1.0 | 1.0 | 1.0 | 1.0 | 1.0 |
| Antioxidant 6C | 1.0 | 1.0 | 1.0 | 1.0 | 1.0 | 1.0 | 1.0 | 1.0 |
| Naphthenic oil | 5.0 | 5.0 | 5.0 | 5.0 | 5.0 | 5.0 | 5.0 | 5.0 |
| Sulfur | 0.7 | 0.7 | 0.7 | 0.7 | 0.7 | 0.4 | 1.0 | 0.7 |
| N,N'-m-phenylene-bismaleimide | 3.0 | 3.0 | 3.0 | 3.0 | 3.0 | 3.0 | 3.0 | |
| N,N'-(4,4'-diphenyl-methane)bismaleimide | | | | | | | | 3.0 |
| Accelerator CZ | 2.0 | 2.0 | 2.0 | 2.0 | 2.0 | 2.0 | 2.0 | 2.0 |
| N-phenyl-N-(trichloro-methylthio)benzene-sulfonamide | 2.0 | 2.0 | 2.0 | 2.0 | 2.0 | 2.0 | 2.0 | 2.0 |
| Hardness Hd | 51 | 50 | 50 | 53 | 52 | 50 | 56 | 51 |
| Tensile elongation Eb (%) | 640 | 660 | 680 | 560 | 600 | 630 | 600 | 650 |
| Tensile strength Tb (MPa) | 22 | 21 | 25 | 18 | 20 | 21 | 25 | 22 |
| Hd after aging | 52 | 50 | 52 | 52 | 52 | 51 | 59 | 53 |
| Eb retention after aging (%) | 77 | 75 | 73 | 70 | 75 | 80 | 70 | 75 |
| Tb retention after aging (%) | 60 | 59 | 53 | 76 | 68 | 68 | 55 | 57 |
| Compression set (%) | 21 | 22 | 24 | 15 | 18 | 20 | 25 | 22 |
| Dynamic-to-static modulus ratio (Kd 100/Ks) | 1.26 | 1.25 | 1.26 | 1.20 | 1.23 | 1.27 | 1.20 | 1.27 |
| Low temperature properties | good | good | good | good | good | good | good | good |

| Rubber formulation | Example | | | | | | |
|---|---|---|---|---|---|---|---|
| (pbw) | 9 | 10 | 11 | 12 | 13 | 14 | 15 |
| NR | 80.0 | 80.0 | 80.0 | 80.0 | 80.0 | 80.0 | 80.0 |
| BR (UBEPOL 150L) | 20.0 | 20.0 | 20.0 | 20.0 | 20.0 | 20.0 | 20.0 |
| BR (BR01) | | | | | | | |
| SBR (SBR 1500) | | | | | | | |
| FT CB | 30.0 | 30.0 | 30.0 | 30.0 | | 30.0 | 30.0 |
| FET CB | | | | | 30.0 | | |
| Stearic acid | 1.0 | 1.0 | 1.0 | 1.0 | 1.0 | 1.0 | 1.0 |
| Zinc white | 3.0 | 3.0 | 3.0 | 3.0 | 3.0 | 3.0 | 3.0 |
| WAX | 2.0 | 2.0 | 2.0 | 2.0 | 2.0 | 2.0 | 2.0 |
| Antioxidant RD | 1.0 | 1.0 | 1.0 | 1.0 | 1.0 | 1.0 | 1.0 |
| Antioxidant 6C | 1.0 | 1.0 | 1.0 | 1.0 | 1.0 | 1.0 | 1.0 |
| Naphthenic oil | 5.0 | 5.0 | 5.0 | 5.0 | 5.0 | 5.0 | 5.0 |
| Sulfur | 0.7 | 0.7 | 0.7 | 0.7 | 0.7 | 0.7 | 0.7 |
| N,N'-m-phenylene-bismaleimide | 1.0 | 5.0 | 3.0 | 3.0 | 3.0 | 6.0 | 3.0 |
| N,N'-(4,4'-diphenyl-methane)bismaleimide | | | | | | | |
| Accelerator CZ | 2.0 | 2.0 | 2.0 | 2.0 | 2.0 | 2.0 | 2.0 |
| N-phenyl-N-(trichloro-methylthio)benzene-sulfonamide | 2.0 | 2.0 | 0.2 | 4.0 | 2.0 | 2.0 | 5.0 |
| Hardness Hd | 49 | 53 | 50 | 53 | 51 | 55 | 55 |
| Tensile elongation Eb (%) | 680 | 610 | 670 | 580 | 670 | 550 | 540 |
| Tensile strength Tb (MPa) | 23 | 20 | 23 | 18 | 22 | 16 | 16 |
| Hd after aging | 51 | 54 | 51 | 55 | 53 | 56 | 57 |
| Eb retention after aging (%) | 75 | 78 | 78 | 75 | 79 | 75 | 71 |
| Tb retention after aging (%) | 58 | 61 | 57 | 57 | 64 | 62 | 51 |
| Compression set (%) | 27 | 17 | 23 | 24 | 24 | 17 | 22 |
| Dynamic-to-static modulus ratio (Kd 100/Ks) | 1.27 | 1.25 | 1.29 | 1.26 | 1.29 | 1.25 | 1.25 |
| Low temperature properties | good | good | good | good | good | good | good |

TABLE 2

| Rubber formulation (pbw) | Comparative Example | | | | |
|---|---|---|---|---|---|
| | 1 | 2 | 3 | 4 | 5 |
| NR | 100.0 | 50.0 | 80.0 | 80.0 | 80.0 |
| BR (UBEPOL 150L) | | 50.0 | | 20.0 | 20.0 |
| BR (BR01) | | | | | |
| SBR (SBR 1500) | | | 20.0 | | |
| FT CB | 30.0 | 30.0 | 30.0 | 30.0 | 30.0 |
| FET CB | | | | | |
| Stearic acid | 1.0 | 1.0 | 1.0 | 1.0 | 1.0 |
| Zinc white | 3.0 | 3.0 | 3.0 | 3.0 | 3.0 |
| WAX | 2.0 | 2.0 | 2.0 | 2.0 | 2.0 |
| Antioxidant RD | 1.0 | 1.0 | 1.0 | 1.0 | 1.0 |
| Antioxidant 6C | 1.0 | 1.0 | 1.0 | 1.0 | 1.0 |
| Naphthenic oil | 5.0 | 5.0 | 5.0 | 5.0 | 5.0 |
| Sulfur | 0.7 | 0.7 | 0.7 | 0.7 | 0.7 |
| N,N'-m-phenylenebismaleimide | 3.0 | 3.0 | 3.0 | | 3.0 |
| N,N'-(4,4'-diphenylmethane)bismaleimide | | | | | |
| Accelerator CZ | 2.0 | 2.0 | 2.0 | 2.0 | 2.0 |
| N-phenyl-N-(trichloromethylthio)benzene-sulfonamide | 2.0 | 2.0 | 2.0 | 2.0 | |
| Hardness Hd | 49 | 54 | 51 | 48 | 50 |
| Tensile elongation Eb (%) | 690 | 530 | 680 | 700 | 690 |
| Tensile strength Tb (MPa) | 30 | 15 | 22 | 24 | 23 |
| Hd after aging | 52 | 52 | 53 | 51 | 51 |
| Eb retention after aging (%) | 79 | 67 | 78 | 70 | 74 |
| Tb retention after aging (%) | 61 | 80 | 59 | 54 | 53 |
| Compression set (%) | 26 | 15 | 22 | 33 | 25 |
| Dynamic-to-static modulus ratio (Kd100/Ks) | 1.32 | 1.17 | 1.36 | 1.29 | 1.32 |
| Low temperature properties | NG | good | good | NG | NG |

As is apparent from the results in Tables 1 and 2, the anti-vibration rubber composition in each of the Working Examples had good tensile properties (elongation, strength) and a good heat aging resistance, and also had excellent anti-vibration characteristics (low dynamic-to-static modulus ratio), compression set and low-temperature properties.

By contrast, Comparative Example 1, an example in which natural rubber was used as 100% of the rubber component, had poor anti-vibration characteristics and low-temperature properties. In Comparative Example 2, an example in which the compounding ratio by weight of natural rubber to polybutadiene rubber was 50/50, the tensile strength, which is a basic property of anti-vibration rubber, was low. Comparative Example 3, an example in which styrene-butadiene rubber was used instead of polybutadiene rubber, had a high dynamic-to-static modulus ratio, and thus poor anti-vibration characteristics. Comparative Example 4, an example in which bismaleimide compound was not included, had a poor compression set and poor low-temperature properties. Comparative Example 5, an example in which N-phenyl-N-(trichloromethylthio)benzenesulfonamide was not included, had poor anti-vibration characteristics and poor low-temperature properties.

The invention claimed is:

1. An anti-vibration rubber composition characterized by comprising a rubber component containing natural rubber and polybutadiene rubber in a compounding ratio by weight therebetween of from 60/40 to 90/10, sulfur, a bismaleimide compound and N-phenyl-N-(trichloromethylthio)benzenesulfonamide.

2. The anti-vibration rubber composition according to claim 1, wherein the bismaleimide compound is included in an amount of from 1.0 to 5.0 parts by weight per 100 parts by weight of the rubber component.

3. The anti-vibration rubber composition according to claim 1, wherein the N-phenyl-N-(trichloromethylthio)-benzenesulfonamide is included in an amount of from 0.2 to 4.0 parts by weight per 100 parts by weight of the rubber component.

4. The anti-vibration rubber composition according to claim 1, wherein the sulfur is included in an amount of from 0.4 to 1.0 part by weight per 100 parts by weight of the rubber component.

5. An anti-vibration rubber obtained by curing the anti-vibration rubber composition of claim 1.

* * * * *